United States Patent [19]

Lee et al.

[11] E Re. 30,503

[45] Reissued Feb. 3, 1981

[54] COMPOSITE OF BONDED CUBIC BORON NITRIDE CRYSTALS ON A SILICON CARBIDE SUBSTRATE

[75] Inventors: Minyoung Lee, Schenectady; Lawrence E. Szala, Scotia, both of N.Y.

[73] Assignee: General Electric Company, Schenectady, N.Y.

[21] Appl. No.: 30,275

[22] Filed: Apr. 16, 1979

Related U.S. Patent Documents

Reissue of:

[64] Patent No.: 4,110,084
Issued: Aug. 29, 1978
Appl. No.: 787,858
Filed: Apr. 15, 1977

[51] Int. Cl.[3] ..... B24D 3/06

[52] U.S. Cl. ..... 51/307; 51/309; 264/60; 264/65

[58] Field of Search ..... 51/295, 307, 309; 264/60, 65

[56] References Cited

U.S. PATENT DOCUMENTS

| | | | |
|---|---|---|---|
| 3,407,445 | 10/1968 | Strong | 51/309 |
| 3,743,489 | 7/1973 | Wentorf et al. | 51/309 |
| 3,767,371 | 10/1973 | Wentorf et al. | 51/307 |
| 3,871,840 | 3/1975 | Wilder | 51/309 |
| 3,982,911 | 9/1976 | Lee | 51/307 |

*Primary Examiner*—Donald J. Arnold
*Attorney, Agent, or Firm*—Jane M. Binkowski; James C. Davis, Jr.; Leo I. MaLossi

[57] ABSTRACT

A mass of cubic boron nitride (CBN) crystals, aluminum or aluminum alloy and a silicon carbide ceramic substrate are disposed in a container which is placed within a pressure-transmitting powder medium. Pressure ranging from about 20,000 psi to about 200,000 psi is applied to the powder medium resulting in substantially isostatic pressure being applied to the container and its contents. To the resulting shaped substantially-isostatic system of powder-enveloped container, heat and pressure are applied simultaneously whereby the aluminum or aluminum alloy is liquefied and infiltrated through the interstices between the CBN crystals and diffused into the contacting face of the silicon carbide substrate sufficiently to produce, upon cooling, an adherently bonded integral composite.

10 Claims, 5 Drawing Figures

COMPOSITE OF BONDED CUBIC BORON NITRIDE CRYSTALS ON A SILICON CARBIDE SUBSTRATE

Matter enclosed in heavy brackets [ ] appears in the original patent but forms no part of this reissue specification; matter printed in italics indicates the additions made by reissue.

This invention relates to a process of preparing an abrasive composite comprised of a dense mass of cubic boron nitride crystals bonded to a silicon carbide ceramic substrate.

U.S. Pat. No. 3,743,489 to Wentorf et al. discloses high temperature, ultra high pressure preparation of tool inserts of cubic boron nitride crystals bonded to a sintered carbide using certain aluminum alloys as bonding medium at temperatures of about 1300°-1600° C., while at the same time subjecting the system to very high pressure to insure thermodynamically stable conditions for the CBN content, i.e., at 1300° C. the minimum pressure should be about 40 kilobars (588,000 psi) and at 1600° C. the minimum pressure should be about 50 kilobars (735,000 psi). These superpressure techniques produced tool inserts that are a valuable contribution to the machining art.

It would be most desirable to develop a low (relative to the superpressures) pressure process for preparing composite bodies of cubic boron nitride crystals bonded to a substrate. U.S. Pat. No. 3,982,911 to Lee discloses such a process which includes placing within a container metal alloy, a mass of cubic boron nitride crystals, and a substrate which may be a sintered metal carbide, disposing the container and its contents within a pressure-transmitting powder medium, applying pressure ranging from about 20,000 psi to about 100,000 psi to the powder medium resulting in substantially isostatic pressure being applied to the container and its contents, then simultaneously applying substantially isostatic pressure to and heating the container and its contents, said heating being to a temperature which exceeds the critical wetting temperature of the alloy and said pressure being significantly less than the pressure at which cubic boron nitride is stable at said critical wetting temperature.

Each of the aforementioned patents disclose the same type of sintered carbide, i.e. a metal-bonded carbide. Specifically, the Lee patent discloses that the metal bonded carbide is prepared from sinterable carbide molding powder (mixture of carbide powder and powdered metal bonding agent, preferably cobalt, nickel or iron), that the carbide of the molding powder is preferably tungsten carbide, titanium carbide, tantalum carbide and mixtures thereof, that cobalt is preferred as the sintering metal, and that the carbide molding powder may consist of 75-97% by weight carbide and 3-25% by weight cobalt.

In the sintered cemented carbides of the Lee and Wentorf et al. patents, although there is some direct bonding by fusion between the carbide grains, the major or substantial portion of the carbide grains are bound or cemented together by metal binder. This metal binder imparts some degrees of deformation or plasticity to these cemented carbides so that they can deform without failing at the interface, and although these cemented carbides are not as brittle as a ceramic, they also are not as hard.

In contrast to the sintered cemented carbides, a hard brittle ceramic is used as a substrate in forming the present composite. The present ceramic is a polycrystalline silicon carbide body which contains no metal or other additive which binds the silicon carbide grains together. Specifically, the silicon carbide grains of the present ceramic substrate are bonded directly to each other by [fusion] *diffusion.*

The patent to Lee indicates that unless an intermediate substrate as molybdenum is used between the cubic boron nitride layer and a ceramic substrate, a direct strong bonding between the cubic boron nitride layer and a ceramic was not generally possible.

However, it has been found now that, although strong bonding between cubic boron nitride and a very hard and brittle ceramic is not possible because such interface fails upon cooling, cubic boron nitride can be bonded to a silicon carbide ceramic substrate in accordance with the present process. Specifically, the present metal infiltrant used for the cubic boron nitride layer will not only infiltrate the densely packed powdered mass of cubic boron nitride but also penetrate and diffuse into the ceramic substrate material and apparently change the thermal expansion coefficient and the fracture property of the substrate ceramic. The degree of penetration and diffusion into the substrate can be over entire or a limited layer of the substrate adjacent to the cubic boron nitride layer.

Briefly stated, the present process comprises placing in a metal container a layer of aluminum or aluminum alloy or metal for providing said aluminum alloy, a layer of a mass of cubic boron nitride (CBN) crystals, the amount of said aluminum or aluminum alloy ranging from about 25% to about 60% by volume of said mass of cubic boron nitride crystals, and a silicon carbide substrate with one face or side of the substrate facing all of said layers and preferably in direct contact with the layer of CBN crystals, preferably vibrating the container to densify the CBN mass to contain CBN crystals in excess of 70% by volume of the CBN mass, placing the container and its contents within a pressure transmitting powder medium, applying pressure at room temperature, i.e. at ambient temperature, to the powder medium ranging from about 20,000 psi to about 200,000 psi thereby subjecting the container and its contents to substantially isostatic pressure which at least substantially stabilizes the dimensions of the container and its contents producing a substantially isostatic shaped system formed of powder-enveloped container, evacuating said isostatic system, introducing a nitrogen gas atmosphere into the evacuated system, then simultaneously applying pressure and heat to the resulting substantially isostatic system, said pressure ranging from about 500 psi to about 100,000 psi and said heat ranging in temperature from the critical wetting temperature of said aluminum or aluminum alloy up to about 1450° C. whereby said aluminum or aluminum alloy in liquid form infiltrates through the voids in said mass of cubic boron nitride crystals and penetrates into the contacting face of the silicon carbide substrate diffusing around the grains and through the pores therein to a depth of at least about twice the thickness of the layer of cubic boron nitride crystals, and cooling the resulting system under sufficient substantially isostatic pressure to maintain the dimensions of said container and contents producing an adherently bonded integral abrasive composite.

"Critical wetting temperature" is defined herein as the temperature at which aluminum or the present aluminum alloy in molten form will infuse or infiltrate into the capillary-size passages, interstices or voids between the CBN crystals comprising the present mass of CBN crystals to be bonded.

The nature of this invention as well as objects and advantages thereof will be readily apparent from consideration of the following specification relating to the annexed drawings in which:

FIG. 1 is a cross-sectional view of a cell for accomplishing metal infiltration according to this invention;

FIG. 2 schematically represents apparatus for applying light pressure to the cell of FIG. 1 while the cell is being vibrated to increase the density of the mass of CBN crystals;

Figure 1:
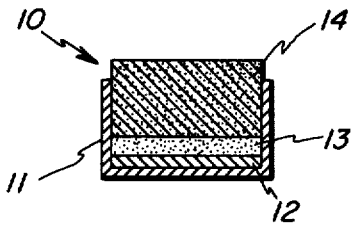

In the present invention the metal of metal alloys useful for infusing through the voids between the CBN crystals or particles are aluminum and certain aluminum alloys. The alloy should contain aluminum in an amount of at least about 85% by weight of the alloy. Alloys containing significantly less than 85% by weight aluminum do not result in satisfactory bonding between the crystals. The metal or metals alloyed with alluminum are those which, when molten, form the present alloy therewith that is also homogeneous when solidified. The particularly preferred alloying metals are nickel, cobalt, manganese, iron, vanadium, chromium and mixtures thereof.

In the present process, the infusing metal, i.e. the present aluminum alloy as well as aluminum itself, must have certain properties. It must have a critical wetting temperature below about 1400° C., and preferably, it has a melting point below about 1200° C. Also, it should be capable of reducing, at least to a significant extent, any thin boron oxide $B_2O_3$ glass film that may be present on the CBN crystals. It should also exhibit a finite but limited reactivity with CBN, i.e. any reaction with CBN should be less than about 5% by weight of the CBN.

The aluminum or aluminum alloy, for example, may be in disc or powder form. If desired, the aluminum alloy can be formed in situ, for example, from stacked layers of foil of aluminum and alloying metal in proper amounts or from a powder mixture of the aluminum and alloying metal.

The cubic boron nitride crystals can range in size in largest dimension from less than 1 micron to about 100 microns, and the particular size or sizes used depends largely on the particular packing of cubic boron nitride crystals desired and also on the particular use of the resulting abrasive composite. For most applications, cubic boron nitride crystals less than 20 microns are useful and preferred. To maximize the packing of the cubic boron nitride crystals, they should be size-graded to contain small, medium and large-sized crystals. Preferably, the size-graded crystals range from less than 1 micron to about 20 microns, and preferably within this size range, with about 60% to about 80% by volume of the mass of crystals being of larger size, about 5% to about 10% by volume being of medium size with the balance constituting the small-sized crystals or particles.

Sizing of the CBN crystals is facilitated by the jet-milling of larger CBN grains. The chemical cleaning of the CBN grains may be accomplished by heating (900° C., 1 hour) in ammonia. Jet-milling of the crystals provides particles of greater strength by eliminating crystal weaknesses.

The present silicon carbide substrate is a polycrystalline body having a density ranging from about 85% to about 98% of the theoretical density of silicon carbide. Silicon carbide density given herein is the fractional density based on the theoretical density for silicon carbide of 3.21 gm/cc. A silicon carbide polycrystalline body having a density less than about 85% is not useful because it would not have the required mechanical strength for use as a tool insert. On the other hand, a silicon carbide body having a density higher than about 98% does not appear to be operable in the present process. For best results, the silicon carbide body used as a substrate has a density ranging from about 90% to about 95%. Ordinarily, the higher the density of the silicon carbide body, the higher is its mechanical strength.

In the present invention the polycrystalline silicon carbide substrate is a hot pressed or sintered body comprised of silicon carbide, i.e., it contains silicon carbide in an amount of at least 90% by weight and usually at least 95% by weight, and generally from 96% to 99% by weight, of the body. Any constituent or component of the present polycrystalline silicon carbide body other than silicon carbide should have no significant deteriorating effect on the mechanical properties of the resulting abrasive composite. Specifically, it should have no significant deteriorating effect on the properties of the silicon carbide and all other materials used in the present process in preparing the composite or on the properties of the composite itself. Ordinarily, the present polycrystalline silicon carbide body contains boron, usually in an amount of at least about 0.3%, and generally up to about 3% by weight based on the silicon carbide.

The present silicon carbide body can be prepared by sintering processes disclosed in U.S. Pat. No. 4,004,934 and copending Ser. Nos. 681,706 filed Apr. 29, 1976 now abandoned and 707,117 filed July 21, 1976, all in the name of Svante Prochazka and assigned to the assignee hereof, and by reference, all applications and patent are incorporated herein.

Briefly stated, the sintered silicon carbide body can be prepared by providing a submicron particulate mixture of $\beta$-silicon carbide, boron additive and a carbonaceous additive which is free carbon or a carbonaceous organic material which is heat-decomposible to produce free carbon, and shaping the mixture into a green body. In an alternative method $\alpha$-SiC, submicron in size but with an average particle size twice that of $\beta$-SiC, is admixed with the particulate mixture in an amount of 0.05% to 5% by weight based on the $\beta$-SiC. The green body is sintered at a temperature ranging from about 1900° C. to 2300° C. to the required density.

Specifically, the boron additive may be in the form of elemental boron, boron carbide or a boron compound which decomposes at a temperature below sintering temperature to yield boron or boron carbide and gaseous products of decomposition and is used in an amount equivalent to 0.3% to 3.0% by weight of elemental boron based on the amount of silicon carbide. During sintering, the boron additive enters into solid solution with the silicon carbide, and when amounts of the additive in excess of that equivalent to about 1% by weight of elemental boron are used, a boron carbide phase also precipitates.

The carbonaceous additive is used in an amount equivalent to 0.1% by weight to 1.0% by weight of free carbon based on the amount of silicon carbide. The additive can be free carbon or a solid or liquid carbonaceous organic material which completely decomposes at a temperature of 50° to 1000° C. to submicron size free carbon and gaseous products of decomposition. Examples of carbonaceous additives are polymers of aromatic hydrocarbons such as polyphenylene or polymethylphenylene which are soluble in aromatic hydrocarbons.

The sintered body is comprised of silicon carbide and based on the amount of silicon carbide, from about 0.3% to about 3% by weight of boron and up to about 1% by weight of free carbon. The boron is in solid solution with the silicon carbide or, alternatively, in solid solution with the silicon carbide and also present as a boron carbide phase. The free carbon, when it is detectable, is in the form of submicron particles dispersed throughout the sintered body.

Hot pressed silicon carbide bodies can be prepared by processes disclosed in U.S. Pat. No. 3,853,566 to Prochazka and copending Ser. No. 695,246 filed June 11, 1976 in the names of Svante Prochazka and William J. Dondalski, all assigned to the assignee hereof and all, by reference, are incorporated herein.

In one hot pressing process, a dispersion of submicron powder of silicon carbide and an amount of boron or boron carbide equivalent to 0.5-3.0% by weight of boron, is hot pressed at 1900°-2000° C. under 5000-10,000 psi to produce a boron-containing silicon carbide body. In another hot pressing process, 0.5-3.0% by weight of elemental carbon or carbonaceous additive heat-decomposible to elemental carbon is included in the dispersion.

In the arrangement shown in FIG. 1, cell assembly 10 consists of metal cup 11 (right circular cylindrical wall with bottom) of a metal preferably selected from the group consisting of zirconium, titanium, tantalum and molybdenum. Within cup 11 are disposed a metal disc 12 of aluminum or aluminum alloy, a mass 13 of CBN crystals and a thick plug 14 of the present silicon carbide substrate, e.g. a cylinder of silicon carbide fitting closely into cup 11 and acting as a closure therefor. If desired, an additional aluminum or aluminum alloy metal disc may be placed intermediate CBN mass 13 and silicon carbide substrate 14. Any aluminum or aluminum alloy or metal for providing said aluminum alloy placed between CBN mass 13 and substrate 14 should be sufficiently thin so that it leaves no significant residue, i.e. a separate layer, at the interface between the resulting layer of bonded crystals and substrate or prevents a strong adherent bond from being formed at such interface which would prevent the use of the composite as a tool insert. Preferably, any metal positioned between CBN mass 13 and substrate 14 should have a thickness of about one mil or less.

Prior to being introduced into cup 11, the CBN crystals or particles are preferably chemically cleaned to remove any boron oxide, $B_2O_3$, from the surface thereof.

Figure 2:
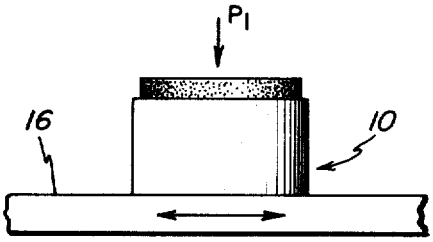

The purpose of using size-graded CBN crystals is to produce maximum packing of the CBN crystals. The arrangement shown in FIG. 2 is useful for increasing the density or packing of the CBN crystals. Specifically, cell 10 is placed on vibrating table 16 and held there under light pressure (about 50 psi) application during the vibration of cell 10 which promotes rearrangement of the CBN crystals or particles to fill spaces and decreases void content in order to increase the density of the CBN layer to greater than 70% by volume.

Having accomplished the requisite degree of consolidation (determined by independent testing on the same graded CBN mix in a fixed dimension die), cell 10 is subjected to a cold pressing step which is carried out at room or ambient temperature to produce a dimensional stabilized isostatic system. Specifically, cell 10 is placed in the cylindrical core of pressure mold 20 surrounded by mass 19 of very fine particles, preferably —400 mesh, of a pressure-transmitting powder medium which remains substantially unsintered under the pressure and temperature conditions of the present process such as hexagonal boron nitride and silicon nitride. This pressure-transmitting powder medium provides for the application of approximately or substantially isostatic pressure to cell 10, whereby the shape and density of the contents of cup 11 will be determined. Thereafter, this shape and density will be retained at least in planes extending through cup 11 parallel to the interface between the layer of metal to be infused and the CBN layer for the subsequent hot pressing step, i.e. simultaneous application of pressure and heat thereto. Pressure mold 20 (ring 22 and pistons 23, 23a) may be made of tool steel and, if desired, ring 22 may be supplied with a sintered carbide sleeve 22a as shown to permit the application of pressures as high as 200,000 psi. Pressures higher than 200,000 psi provide no significant advantage. Within the confines of piston 23, sleeve 22a and piston 23a, pressure preferably in the range of from about 20,000 psi to about 100,000 psi, and usually to about 50,000 psi, is exerted on the pressure-transmitting powder medium by the pistons actuated in the conventional manner until the applied pressure becomes stabilized as is done in conventional powder packing technology.

The nature of present pressure-transmitting powder medium, such as hexagonal boron nitride and silicon nitride, is such that it results in an approximation of a hydrostatic action in response to the uniaxially applied pressure to exert substantially isostatic pressure over the entire surface of cell 10. It is assumed that the applied pressure is transmitted substantially undiminished to cell 10. The prime purpose of this pressure application is to bring about a consolidation, which action causes the break-up of any existing deposits of oxides, borides, or nitrides on the surfaces of the crystals, metal or metals and substrate within cell 10. As a result, clean surfaces will be exposed promoting the formation of strong adherent bonds. Simultaneously, the pressure-induced consolidation diminishes the size of the voids to maximize the presence of capillary-size voids in the CBN mass, and it is useful in producing the required density of CBN crystals in excess of 70% by volume of the CBN mass. This reduction in void volume also reduces the ultimate content of non-CBN material in the CBN mass and provides more juxtaposed crystal-to-crystal areas properly located for effective bonding together.

After completion of this cold pressing step, the density of the CBN crystals in cell 10 should be in excess of 70% by volume of the mass of crystals, and preferably, from about 75% to about 90% by volume of the CBN mass. The higher the density of the mass of cubic boron nitride crystals, the less will be the amount of non-cubic boron nitride material present between the crystals resulting in a proportionately harder abrasive composite.

The substantially isostatic system 21 of powder-enveloped container resulting from the cold pressing step is then subjected to a hot pressing step which comprises simultaneous applying pressure and heat to the system 21 wherein the pressure can range from about 500 psi to about 100,000 psi, but for most applications a pressure ranging from about 500 psi to about 10,000 psi is satisfactory. Pressures higher than about 100,000 psi provides no significant advantage. The heating temperature ranges from the critical wetting temperature of the aluminum or aluminum alloy up to about 1450° C.

Specifically, when the cold pressing step is completed, either one of pistons 23, 23a is withdrawn and the resulting consolidated substantially isostatic shaped system 21 is forced out of liner 22a and into a hole of identical diameter in graphite mold 30, the transferred sytem 21 now being contained within the wall of hole 31 between graphite pistons 32, 32a. Graphite mold 30 is provided with thermocouple 33 to provide an indication of the temperature being applied to the dimensionally-stabilized substantially-isostatic system 21. The mold 30, with the substantially-isostatic system 21 so contained, is placed inside a conventional hot pressing furnace (not shown). The furnace chamber is evacuated or at least substantially evacuated causing evacuation of system 21 including cell 10, and nitrogen gas is introduced into the furnace chamber to provide the chamber as well as system 21 including the interior of cell 10 with a nitrogen atmosphere. The nitrogen atmosphere reacts with aluminum in the formation of aluminum nitride which strongly bonds the cubic boron nitride crystals together. While pistons 32, 32a apply a uniaxial pressure ranging from about 500 psi up to about 10,000 psi (or to short of the limit of the strength capabilities of the mold 30) to system 21, the temperature thereof is raised to at least the critical wetting temperature of metal disc 12, i.e. aluminum or aluminum alloy.

In the hot pressing step, the aluminum or aluminum alloy is liquefied and at the heating temperature ranging from its critical wetting temperature up to about 1450° C. it infiltrates between the cubic boron nitride crystals and penetrates into the silicon carbide substrate. Specifically, on the onset of melting of the metal the application of pressure breaks up interfacial refractory layer largely oxide as well as nitride which usually forms between the molten metal and CBN surfaces exposing the capillary void system to the metal, after which infusion by capillary action can occur, when the critical wetting temperature of the aluminum or aluminum alloy has been reached. Tests have shown that unless pressure is applied to system 21 when the aluminum or aluminum alloy has been rendered molten and the heating to the critical wetting temperature occurs, infusion of the CBN mass by the aluminum or aluminum alloy will not occur.

It is during this hot pressing step that it is particularly important that dimensional stability of the dimensionally stabilized cell 10, be maintained. So long as constant dimensions of the cell are maintained, when the aluminum or aluminum alloy is converted to the liquid state, this liquid will not be able to pass between mass 13 and cup 11 and escape to any significant extent, but will be forced to move through the mass 13 of CBN crystals and also through the contacting face or side of substrate 14. During such infusion aluminum reacts with the nitrogen gas present as well as the nitride at the surface of the boron nitride producing aluminum nitride which strongly and adherently bonds the crystals together. Normally, the metal or metals which are alloyed with aluminum do not form nitride or may form nitride in a minor amount. The aluminum and aluminum alloys do not appear to form borides to any significant extent. The aluminum or aluminum alloy also penetrates into the contacting surface of the silicon carbide substrate diffusing around the grains and through the pores therein.

In the hot pressing step the heating temperature ranging from the critical wetting temperature of the metal to about 1450° C. should be reached quickly and held at such temperature usually for at least about 1 minute to insure satisfactory infiltration of the CBN mass and the required diffusion into the silicon carbide substrate. Generally, a time period ranging from about 1 minute to about 10 minutes at the heating temperature ranging from the critical wetting temperature of the metal to about 1450° C. is satisfactory, and periods of time significantly longer than about 10 minutes provide no significant advantage.

Although eventually the heat and pressure must be simultaneously applied to system 21, it may be of advantage depending on the particular metal used, to apply heat before the pressure application or to apply pressure before the initiation of the heating operation.

When the hot pressing step is completed, at least sufficient pressure should be maintained during cooling of the system 21 so that cell 10, maintained within the sytem 21 during cooling, is subject to isostatic pressure sufficient to preserve its dimensional stability. Preferably, system 21 is allowed to cool to room temperature. Cell 10 is then removed from the system, and the present abrasive composite is recovered. Adherent metal from the protective container and any squeezed out excess aluminum or aluminum alloy at the outside surfaces of the abrasive composite can be removed by conventional techniques such as grinding.

The aluminum atom-containing phase rich in aluminum penetrating into the contacting side or face of the silicon carbide substrate diffuses around the grains and through the pores therein forming a continuous network therein and should be diffused to a depth of at least about twice the thickness of the layer of cubic boron nitride crystals. Such diffusion is necessary to maintain the integrity of the silicon carbide substrate and thereby the resulting composite since significantly less than the required depth of diffusion would not be sufficient to withstand the shearing forces exerted between the layer of cubic boron nitride crystals and the silicon carbide substrate causing cracking in the silicon carbide substrate between the diffused portion and that portion of which is free of the diffused aluminum phase. Generally, the thickness of the layer of CBN crystals being bonded or the thickness of the bonded CBN crystals ranges from about 5 mils to about 50 mils, and for most applications ranges from about 10 mils to about 40 mils. The thickness of the silicon carbide substrate can vary depending on the final application of the resulting composite, but it should be at least sufficiently thick to provide adequate support for the bonded layer of cubic boron nitride crystals, i.e. it should be at least about twice the thickness of the layer of bonded cubic boron nitride crystals.

The present cubic boron nitride abrasive composite is comprised of a layer of a mass of cubic boron nitride crystals bonded to each other and to a substrate of a polycrystalline silicon carbide body with an aluminum atom-containing phase infiltrated at least substantially and usually completely through said layer of crystals and diffused as an aluminum atom-containing phase rich in aluminum through the contacting surface of said silicon carbide body around the grains and through the pores therein to a depth of at least about twice the thickness of said layer of bonded cubic boron nitride crystals, said layer of bonded cubic boron nitride crystals consisting essentially of cubic boron nitride crystals having a density higher than 70% by volume of said layer and said aluminum atom-containing phase in an amount less than 30% by volume of said layer with at least a significant portion of said aluminum atom-containing phase in said layer being aluminum nitride present in sufficient amount to at least bond said cubic boron nitride crystals together, said polycrystalline silicon carbide body ranging in density from about 85% to about 98% of the theoretical density of silicon carbide and containing silicon carbide in an amount of at least 90% by weight of said body and being free of constituents which have a significantly deteriorating effect on the mechanical properties of said composite.

When aluminum alone is used as the infiltrating metal, the layer of bonded cubic boron nitride crystals may be comprised of cubic boron nitride crystals and aluminum nitride, or it may be comprised of cubic boron nitride crystals, aluminum nitride and metallic aluminum. Since aluminum nitride is a getter for oxygen, the aluminum nitride is usually oxygen-rich. Also, when aluminum alone is used, it penetrates and diffuses through the silicon carbide substrate as metallic aluminum, or at least substantially metallic aluminum which may contain atoms of silicon, carbon, nitrogen and oxygen.

When aluminum alloy is used as the infiltrating metal, the layer of bonded cubic boron nitride crystals is comprised of cubic boron nitride crystals, aluminum nitride and aluminum alloy in metallic form. If, initially, an additional layer of aluminum or aluminum alloy had been present at the interface between the cubic boron nitride mass and the substrate, the aluminum alloy phase in the resulting composite, i.e. in the layer of bonded CBN crystals as well as the diffused network in the silicon carbide substrate, may be of substantially or of the same composition as the starting aluminum alloy.

However, in the usual embodiment where initially only one layer of aluminum alloy has been used in contact with the CBN mass, as set forth in FIG. 1, the aluminum alloy left as metallic phase in the bonded CBN mass has a composition which is always rich in aluminum but which does not contain as much aluminum as the starting alloy due to the reaction of some of the aluminum to form aluminum nitride. Also, in the usual embodiment, the aluminum alloy diffused and forming a network in the silicon carbide has substantially the same composition as the aluminum alloy metallic phase left in the bonded CBN mass.

Ordinarily, the aluminum or aluminum alloy phase diffused in the silicon carbide substrate has atoms of silicon, carbon, oxygen and nitrogen dissolved or diffused therein which are detectable by ion probe analysis. During diffusion the atoms of silicon and carbon are introduced by silicon carbide in amounts depending largely on diffusing temperature with increasing amounts being introduced with increasing temperature. The amounts of atoms of oxygen and nitrogen can vary depending largely on the amounts present in the system, i.e. the amounts in contact with the hot diffusing aluminum or aluminum alloy.

Preferably, the aluminum atom-containing phase in said layer of bonded CBN crystals contains some metallic aluminum or aluminum aloy, since such metal is non-brittle and provides a surrounding cushion for brittle CBN crystals. Preferably, aluminum or aluminum alloy in metal form is present in at least a significant amount in the layer of bonded cubic boron nitride crystals, i.e. at least in an amount sufficient to significantly decrease the brittleness of a layer consisting only of cubic boron nitride crystals and aluminum nitride.

Assuming all other factors are equal, the particular amount of aluminum nitride and metallic phase, i.e. aluminum or aluminum alloy, present in the layer of bonded cubic boron nitride crystals in the abrasive composite depends largely on the particular hot pressing temperature used and the time period at such temperature. Specifically, with increasing time and/or temperature, i.e. ranging from the critical wetting temperature for the metal used up to about 1450° C., the content of aluminum nitride increases. For example, a time period of about 1 minute should leave a significant amount of metallic phase in the layer of bonded crystals. The production of a composite having a lyer of bonded cubic boron nitride crystals with a particular desired amount of metallic phase, i.e. aluminum or aluminum alloy, to attain certain desirable properties, for example, is determinable empirically.

The layer of bonded cubic boron nitride crystals of the present composite is void or pore-free or may contain voids in an amount less than 2% by volume of the layer of bonded cubic boron nitride crystals providing such voids are small and substantially uniformly distributed throughout the bonded CBN layer so that they have no significant deteriorating effect on the mechanical properties of the layer of bonded cubic boron nitride crystals.

The interface between the layer of bonded cubic boron nitride crystals and substrate is void or pore-free or may contain pores of voids which in area amount to less than 2% of the total area of the interface provided such pores or voids are small and substantially uniformly distributed along the interface so that they have no significant deteriorating effect on the adherent bond at such interface and no significant deteriorating effect on the mechanical properties of the resulting abrasive composite.

The selective area diffraction analysis of transmission electron microscopy on a thin section of the present bonded layer of cubic boron nitride crystals shows aluminum nitride to be present at the boundaries of the cubic boron nitride crystals and also between the cubic boron nitride crystals. Also, X-ray diffraction analysis of the bonded cubic boron nitride layer in crushed form shows the presence of aluminum nitride and aluminum or the particular aluminum alloy when they are present in sufficient amount to be detectable by this technique.

The presence of the metallic phase in the silicon carbide substrate is detectable by a number of techniques. For example, since the diffused phase of aluminum or aluminum alloy forms a continuous network in the silicon carbide, and since silicon carbide alone is non-conductive, the presence of the diffused aluminum phase is detectable by determining the electrical conductivity of the substrate. Also, photomicrographs sufficiently magnified of polished sections of the present composite can show the microstructure of the composite as well as the presence of metallic phases when they are present.

Unless otherwise stated, the procedure in the following examples was as follows:

Alloy composition is given by weight of the alloy.

Density given herein of the polycrystalline silicon carbide body used as a substrate is the fractional density based on the theoretical density of the silicon carbide of 3.21 gm/cc.

All of the polycrystalline silicon carbide bodies, sintered as well as hot pressed, used as substrates had substantially the same composition, which was comprised of silicon carbide, about 1% to 2% by weight of boron based on said silicon carbide and less than about 1% by weight of submicron elemental carbon based on said silicon carbide.

EXAMPLE 1

Figure 3:
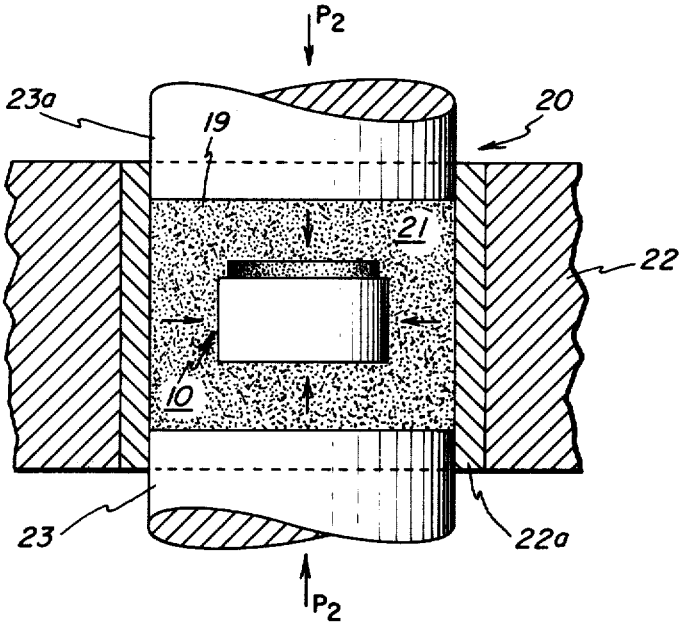
FIG. 3 is a sectional view through an apparatus for applying at least substantially isostatic pressure to the cell by means of finely-divided particulate mass to dimensionally stabilize the cell producing a substantially isostatic system.

A cast 88 w/o Al and 12 w/o Ni alloy disc weighing 116 mg and having a thickness of about 25 mil was placed in a zirconium cup. This alloy has a melting point below 1200° C. and a critical wetting temperature below 1400° C. A layer of about 150 mg of a graded mixture of a jet milled cubic boron nitride powder ranging in size from submicron to about 12 microns was packed on top of this cast alloy disc. About 60% by volume of the powder ranged in size from about 6 to about 12 microns, about 40% by volume of the powder ranged in size from about 1 to 5 microns with the remainder being submicron in size. Finally, a sintered polycrystalline silicon carbide disc of uniform density of about 95%, i.e. about 5% porosity, of 125 mil thickness was placed on top of the boron nitride powder forming a plug in the zirconium cup as shown by 14 in FIG. 1. The cup was then placed within hexagonal boron nitride powder, −400 mesh, as shown in FIG. 3, and the whole charge was pressed at room temperature to about 50,000 psi, as shown in FIG. 3, so that the cup was subjected to substantially isostatic pressure. From previous experiments it was known that in the resulting pressed assembly, i.e. in the resulting shaped substantially isostatic system of powder-enveloped cup and contents, that the density of the CBN crystals was about 75% by volume of the CBN mass.

Figure 4:
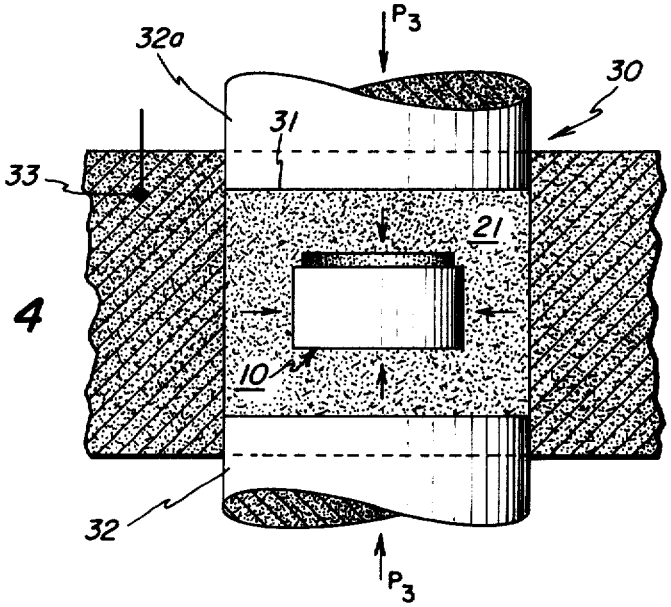
FIG. 4 is a sectional view through a graphite mold for the simultaneous application of heat and pressure to the substantially isostatic system showing the cell enclosed therein and FIG. 5 is a photograph (magnified 700 ×) of a polished transverse section of a cubic boron nitride abrasive composite prepared by the present process.

The resulting isostatic system 21 was loaded into a graphite mold as shown in FIG. 4 and placed within an induction heater. The interior of the cup was evacuated and a nitrogen atmosphere introduced therein by evacuating the heater and introducing a nitrogen atmosphere therein. The resulting isostatic system was heated to 1300° C. and maintained at 1300° C. under about 10,000 psi for 6 minutes. The power was then turned off and the mold was kept under pressure on cooling to room temperature which maintained the dimensions of the cup, i.e. the powder-enveloped cup and contents.

The resulting integral abrasive composite was recovered by grinding away from zirconium metal cup and excess aluminum alloy at the outside surface of the composite.

The resulting integral abrasive composite was comprised of a layer of cubic boron nitride crystals or particles strongly bonded to each other and to the substrate. The layer of bonded CBN crystals was about 40 mils thick. The silicon carbide showed diffusion of the aluminum alloy phase to a substantially uniform depth greater than twice the thickness of the layer of bonded CBN crystals.

Figure 5:
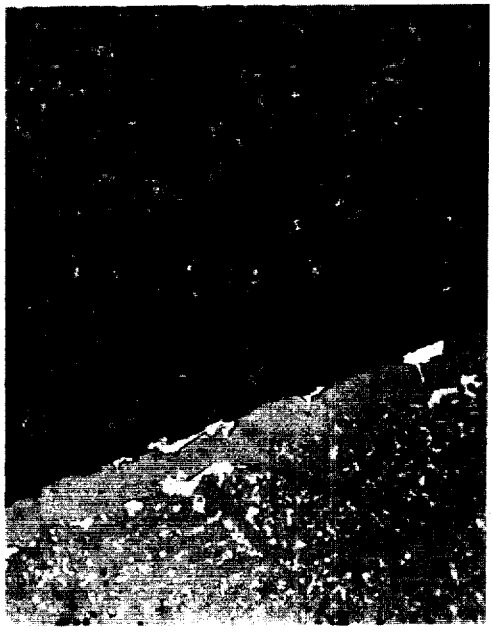

FIG. 5 is a polished transverse section of the resulting cubic boron nitride composite. The dark grey area is comprised of cubic boron nitride crystals strongly bonded together and shows a metallic phase, i.e. aluminum alloy, distributed therein. The light grey area in FIG. 5 is the substrate of silicon carbide showing metallic phase, i.e. aluminum alloy phase, diffused therein. Polishing of this composite was difficult due to the difference in hardness between the cubic boron nitride layer and the substrate and also due to the presence of the metallic phase.

From the composite a cutting tool was ground which was 235 mil square and 125 mil thick with about 30 mil layer of the bonded cubic boron nitride bonded to the substrate.

The tool was evaluated on a lathe turning of a solution-treated and aged Inconel 718 nickel base superalloy (hardness Rockwell C-43) at 600 surface feet per minute with 5 mil feed per revolution and 40 mil depth of cut. After one minute of cutting time, the tool showed about 9 mil length of uniform flank wear and about 19 mil length of localized depth of cut line notch. Examination of the tool showed no strings of holes formed from CBN fragment pulled-out. Also, the layer of bonded CBN crystals remained strongly adherent to the substrate.

EXAMPLE 2

An abrasive composite was prepared in the same manner disclosed by Example 1 except that an additional layer of infiltrant, a one mil thick disc of commercial purity aluminum, was placed between the cubic boron nitride powder and the silicon carbide substrate.

The resulting integral abrasive composite showed good bonding between the CBN crystals and a strong adherent bond to the substrate. The bonded layer of CBN crystals was about 40 mils thick, and the silicon carbide substrate showed diffusion of the aluminum alloy therein to a substantially uniform depth greater than about twice the thickness of the layer of bonded CBN crystals.

A cutting tool of substantially the same dimension as the cutting tool disclosed in Example 1 was prepared from this composite. It was evaluated in the same manner as disclosed in Example 1 and showed about equivalent performance.

EXAMPLE 3

An abrasive composite was prepared in the same manner as disclosed in Example 2 except that a 125 mil thick hot pressed polycrystalline silicon carbide having a density higher than 985%, i.e. less than 2% porosity, was used as the substrate.

The recovered resulting abrasive composite showed good bonding between the CBN crystals and a good adherent bond to the substrate. However, the aluminum alloy penetrated only about a 50 mil thickness of the substrate and a crack appeared within the substrate just beyond the boundary where the alloy diffusion stopped. A tool was shaped from this compact but the substrate fractured during machining. The amount of wear was about equivalent to that of Examples 1 and 2.

EXAMPLE 4

An abrasive composite was prepared by the same process as disclosed in Example 2 except that a sintered polycrystalline silicon carbide substrate was used which had a density of about 92%, i.e. about 8% porosity.

The recovered resulting abrasive composite showed good bonding between the CBN crystals and a good adherent bond to the substrate. The aluminum alloy penetrated substantially uniformly the entire body of the substrate. The composite was integral and no cracks appeared in the substrate.

What is claimed is:

1. A process for preparing an abrasive composite consisting essentially of the steps of:

a. placing within a metal container a layer of metal selected from the group consisting of aluminum, aluminum alloy, or alloying metals for providing said aluminum alloy, a layer of a mass of cubic boron nitride crystals, and a silicon carbide substrate, said substrate being disposed with one face or one side facing said layers and in contact with said layer of cubic boron nitride crystals, said aluminum alloy containing aluminum in an amount of at least about 85% by weight of the alloy, said aluminum and aluminum alloy having a critical wetting temperature of less than about 1400° C., being capable of reducing $B_2O_3$ and exhibiting a limited finite reactivity with cubic boron nitride, the amount of said aluminum or aluminum alloy ranging from about 25% to about 60% by volume of said mass of cubic boron nitride crystals, said substrate consisting essentially of a hot-pressed or sintered polycrystalline silicon carbide body wherein the silicon carbide grains are bonded directly to each other by [fusion] *diffusion* only having a density ranging from about 85% to about 98% of the theoretical density of silicon carbide and containing silicon carbide in an amount of at least 90% by weight of said substrate body and being free of constituents which have a significantly deteriorating effect on any of the materials forming the present abrasive composite;

b. disposing said container and the contents thereof within a pressure-transmitting powder medium that remains at least substantially unsintered under the operating conditions of temperature and pressure and that transmits applied pressure substantially undiminished;

c. applying substantially isostatic pressure to said container and said contents via said pressure transmitting medium, said applied pressure ranging from about 20,000 psi to about 200,000 psi, the application of pressure being maintained at least long enough to substantially stabilize the dimensions of said container and said contents at least in planes through said container parallel to the interface between the layers of metal and cubic boron nitride crystals producing a substantially isostatic system of powder-enveloped container and contents wherein the density of cubic boron nitride crystals is higher than 70% by volume of the volume of said mass of cubic boron nitride crystals, d. substantially evacuating said isostatic system including said container;

e. introducing a nitrogen gas atmosphere into said evacuated system including said container;

f. simultaneously applying pressure and heat to the resulting isostatic system of powder enveloped container to pass said aluminum and aluminum alloy through the voids in said mass of CBN crystals and into the contacting face or side of said silicon carbide substrate to a depth at least about twice the thickness of said layer of cubic boron nitride crystals, said pressure ranging from about 500 psi to about 100,000 psi and said heating being to a temperature ranging from the critical wetting temperature of said aluminum and aluminum alloy to about 1450° C.;

g. maintaining sufficient pressure on the resulting isostatic system during cooling thereof to maintain the dimensions of said container and h. recovering the resulting abrasive composite.

2. The process of claim 1 wherein the mass of cubic boron nitride crystals are size-graded, the crystals sizes ranging up to about 20 microns.

3. A process according to claim 1 wherein said polycrystalline silicon carbide body is a sintered body.

4. A process according to claim 1 wherein said polycrystalline silicon carbide body is a hot pressed body.

5. A process according to claim 1 wherein a layer having a thickness of about 1 mil or less of aluminum, or said aluminum alloy, or metal for providing said aluminum alloy, is placed intermediate said layer of cubic boron nitride crystals and said contacting substrate.

6. A cubic boron nitride abrasive composite consisting of a layer of a mass of cubic boron nitride crystals bonded to each other and to a substrate of a polycrystalline silicon carbide body with an aluminum atom-containing phase infiltrated at least substantially and usually completely through said layer of crystals and diffused as an aluminum atom-containing phase rich in aluminum through the contacting surface of said silicon carbide body around the grains and through the pores therein to a depth of at least about twice the thickness of said layer of bonded cubic boron nitride crystals, said layer of bonded cubic boron nitride crystals consisting essentially of cubic boron nitride crystals wherein the density of said crystals ranges from higher than 70% by volume to about 90% by volume of said layer and said aluminum atom-containing phase in an amount less than 30% by volume of said layer with at least a significant portion of said aluminum atom-containing phase in said layer being aluminum nitride present in sufficient amount to at least bond said cubic boron nitride crystals together, said layer of bonded cubic boron nitride crystals containing voids up to less than 2% by volume of said layer, said voids having no significant deteriorating effect on the mechanical properties of said layer, said polycrystalline silicon carbide body being a hot-pressed or sintered body wherein the silicon carbide grains are bonded directly to each other by [fusion] *diffusion* only ranging in density from about 85% to about 98% of the theoretical density of silicon carbide and containing silicon carbide in an amount of at least 90% by weight of said body and being free of constituents which have a significantly deteriorating effect on the mechanical properties of said composite.

7. A composite according to claim 6 wherein said aluminum atom-containing phase consists essentially of aluminum and aluminum nitride.

8. A composite according to claim 6 wherein said aluminum atom-containing phase consists essentially of aluminum nitride and aluminum alloy rich in aluminum.

9. A composite according to claim 8 wherein said aluminum alloy is comprised of aluminum and a metal selected from the group consisting of nickel, cobalt, manganese, iron, vanadium, chromium and mixtures thereof.

10. A composite according to claim 6 wherein the density of said cubic boron nitride crystals ranges from about 75% to about 90% by volume of said layer of bonded cubic boron nitride crystals.

* * * * *